United States Patent [19]
Lin et al.

[11] Patent Number: 6,160,082
[45] Date of Patent: *Dec. 12, 2000

[54] PROCESS FOR BRANCHING THERMOPLASTIC LINEAR POLYCARBONATE RESINS

[75] Inventors: Ye-Gang Lin, Evansville; Roy R. Odle; William J. Swatos, both of Mt. Vernon; Pin-pin Wu, Evansville, all of Ind.

[73] Assignee: General Electric Company, Pittsfield, Mass.

[ * ] Notice: This patent is subject to a terminal disclaimer.

[21] Appl. No.: 08/964,548

[22] Filed: Nov. 5, 1997

[51] Int. Cl.$^7$ .................................................. C08G 64/00
[52] U.S. Cl. ................................................ 528/196
[58] Field of Search ............................................... 528/196

[56] References Cited

U.S. PATENT DOCUMENTS

| | | | |
|---|---|---|---|
| 2,999,835 | 9/1961 | Goldberg | 528/176 |
| 3,027,814 | 4/1962 | Schnellmann et al. | 528/196 |
| 3,028,365 | 4/1962 | Schnell et al. | 528/196 |
| 3,030,331 | 4/1962 | Goldberg | 528/196 |
| 3,153,008 | 10/1964 | Fox | 528/196 |
| 3,169,121 | 2/1965 | Goldberg | 528/196 |
| 3,275,601 | 9/1966 | Schnell et al. | 528/196 |
| 3,334,154 | 8/1967 | Kim | 528/196 |
| 3,915,926 | 10/1975 | Wambach | 528/196 |
| 4,188,314 | 2/1980 | Fox et al. | 525/433 |
| 4,415,722 | 11/1983 | Mark et al. | 528/196 |
| 4,469,861 | 9/1984 | Mark et al. | 528/196 |
| 4,474,999 | 10/1984 | Mark et al. | 568/720 |
| 4,487,896 | 12/1984 | Mark et al. | 525/439 |
| 4,550,155 | 10/1985 | Jones et al. | 528/176 |
| 4,621,132 | 11/1986 | Quinn et al. | 528/194 |
| 4,888,400 | 12/1989 | Boden et al. | 525/462 |
| 5,089,598 | 2/1992 | Hawkins et al. | 528/272 |

FOREIGN PATENT DOCUMENTS 0 400 478 A2 12/1990 European Pat. Off. .
0 819 718 A1 1/1998 European Pat. Off. .

*Primary Examiner*—Terressa Mosley-Boykin

[57] ABSTRACT

Linear polyesters are branched by transesterification with resins having the formula:

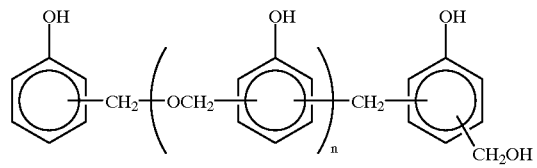

wherein n is an integer of from 1 to 10.

10 Claims, No Drawings

PROCESS FOR BRANCHING THERMOPLASTIC LINEAR POLYCARBONATE RESINS

BACKGROUND OF THE INVENTION

Field of the Invention

The invention relates to polycarbonate resins and their use in molding articles.

BRIEF DESCRIPTION OF THE RELATED ART

Aromatic polycarbonate resins are a well known class of synthetic polymeric resins, generally prepared by the reaction of a polyhydric phenol with a carbonate precursor; see for example U.S. Pat. No. 3,028,365. Although such resins have been found to be thermoplastically moldable under a broad range of molding conditions, only select polycarbonate resin compositions are useful for blow-molding. This is due to the unique requirements of a thermoplastic resin for blow-molding operations; see for example the requirements for the branched polycarbonate resins described in U.S. Pat. No. 4,286,083 and 4,621,132. The branched polycarbonate resins differ from most thermoplastic polymers used for molding in their melt rheology behavior. Most thermoplastic polymers exhibit non-Newtonian flow characteristics over essentially all melt processing conditions. However, in contrast to most thermoplastic polymers, certain branched polycarbonates prepared from dihydric phenols exhibit Newtonian flow at normal processing temperatures and shear rates below 300 reciprocal seconds.

Newtonian flow is defined as the type of flow occurring in a liquid system where the rate of shear is directly proportional to the shearing force.

Two other characteristics of molten thermoplastic polymers considered to be significant for molding operations are melt elasticity and melt strength. Melt elasticity is the recovery of the elastic energy stored within the melt from distortion or orientation of the molecules by shearing stresses. Melt strength may be simply described as the tenacity of a molten strand and indicates the ability of the melt to support a stress. Both of these characteristics are important in extrusion blow molding, particularly in fabrication by extrusion blow molding of relatively large articles. Non-Newtonian flow characteristics tend to impart melt elasticity and melt strength to polymers thus allowing their use in blow molding fabrication.

In the conventional blow-molding operation, a tube of the heat-softened polycarbonate resin may be extruded vertically into a mold. The extrudate is then pressed onto the mold surfaces with a pressurized gas flow (usually air or inert gas), shaping the heat-softened resin.

In practice, the desired physical characteristics of a blow-moldable polycarbonate resin can be achieved preferably by a branched polycarbonate. Currently, a branched resin is synthesized. The proper melt strength and viscosity is obtained by controlling the molecular weight and the branching level. It would be highly advantageous if the same rheological behavior could be achieved by reacting a linear polycarbonate, during the compounding process in such a way that a polymer or blend of polymers is obtained with same rheological properties as the currently available branched resin prepared by synthesis. This latter synthesis is time consuming and expensive. Any "off-specification" material produced is wasted. These disadvantages are not associated with the production of linear polycarbonate resins.

By the method of the present invention, we were able to produce a polycarbonate resin possessing a certain degree of branching and molecular weight via reactive extrusion. This was achieved by melt extruding a linear polycarbonate C-resin with a specific branching agent and an appropriate catalyst.

SUMMARY OF THE INVENTION

The invention comprises a process for branching a thermoplastic, linear, polycarbonate resin, which comprises;

providing a linear polycarbonate resin;

homogeneously mixing with the linear polycarbonate resin, a branching proportion of a thermoplastic, polymeric, branching resin having formula:

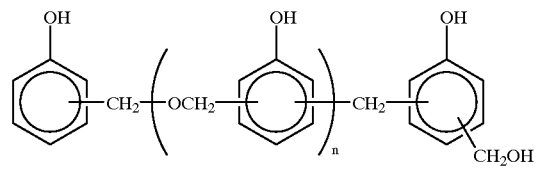

(I)

wherein n is an integer of from 1 to 10; and effecting a branching reaction between the linear polycarbonate resin and the branching resin.

Advantageously the branching reaction is effected by melt extrusion of the mixture.

The branched polycarbonate resins produced by the reactive extrusion process of the invention are particularly useful as blow-moldable resins characterized-in-part by an enhanced melt strength and melt elasticity. The branched polycarbonate products of the invention are also useful in applications such as profile extrusion (for example of wire and cable insulation, extruded bars, pipes, fiber optic buffer tubes, and sheets); blow molding (for example of containers and cans, gas tanks, automotive exterior applications such as bumpers, aerodams, spoilers and ground effects packages); and thermoforming (for example of automotive exterior applications and food packaging) all of which require the enhanced flow properties of a branched polycarbonate.

DETAILED DESCRIPTION OF THE PREFERRED EMBODIMENTS OF THE INVENTION

The linear polycarbonates advantageously branched according to the process of the invention are well known synthetic polymers as are the methods of their preparation.

Polycarbonate resins (linear) and their method of preparation by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

Linear polycarbonate resins used in the process of the invention are resins containing repeating or recurring polycarbonate units of the formula:

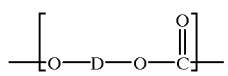

(II)

wherein D is a divalent aromatic radical of a dihydric phenol employed in the polymerization reaction, which comprises the reaction of the dihydric phenol with a carbonate precursor. The reaction is well known and is described for example in the U.S. Pat. Nos. 3,028,365; 3,334,154; 3,275,601; 3,915, 926; 3,030,331; 3,169,121; and 3,027,814.

Although the reaction conditions of the preparative processes may vary, the interfacial polymerization processes typically involve dissolving or dispersing the phenol reactant in a suitable water immiscible solvent medium and contacting the reactants with the carbonate precursor, such as phosgene, in the presence of a suitable catalyst and an aqueous caustic solution under controlled pH conditions. The most commonly used water immiscible solvents include methylene chloride, 1,1-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition and solvent reflux may be used to control the reaction temperature. The amount of phosgene required will generally depend upon the amount of the dihydric phenol present.

As mentioned above, the symbol "D" as used in the formula (II) above designates the divalent aromatic radical of a dihydric phenol used in the preparation of a linear polycarbonate.

Typical of some of the dihydric phenols that are advantageously employed are bis-phenols such as bis(4-hydroxyphenyl) methane, 2,2'-bis- (4-hydroxy-3-methylphenyl)propane, 4,4'-bis(4-hydroxy-phenyl)-heptane, 2,2'-bis(4-hydroxy-3,5-dichloro-phenyl)propane, 2,2'-bis(4-hydroxy-3,5-dibromo-phenyl)propane; dihydric phenol ethers such as bis(4-hydroxphenyl)ether, bis(3,5-dichloro4-hydroxyphenyl)ether; dihydroxydiphenols such as 3,3'-dichloro-4,4'-dihydroxybiphenyl hydroxyphenyl) sulfone, bis(3,5-dimethyl-4-sulfone; dihydroxybenzenes, such as resorcinol and hydroquinone; halo- and alkylsubstituted dihydroxy benzenes such as 1,4-dihydroxy-2,5-dichlorobenzene, 1,4-dihydroxy-3-methylbenzene; and dihydroxy diphenyl sulfides and sulfoxides such as bis(4-hydroxyphenyl)-sulfide and bis(4-hydroxyphenyl) sulfoxide. A variety of additional dihydric phenols are also available and are disclosed in U.S. Pat. Nos. 2,999,835; 3,028, 365 and 3,153,008, all of which are incorporated herein by reference. It is, of course, possible to employ two or more different dihydric phenols or a combination of a dihydric phenol with glycol.

Preferred dihydric phenols are the 4,4'-bisphenols.

The term "polycarbonate" as used herein is also inclusive of copolyester-polycarbonates, i.e.; resins which contain in addition to recurring polycarbonate chain units of Formula (II) given above, wherein D represents the divalent aromatic radical of the dihydric phenol repeating or recurring carboxylate units, for example of formula:

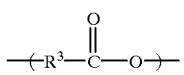

(III)

wherein $R^3$ is a divalent hydrocarbylene group such as an alkylene, alkylidene, or cycloalkylene group; an alkylene, alkylidene or cycloalkylene group containing ethylenic unsaturation; an aromatic group such as phenylene, biphenylene, and the like; two or more aromatic groups connected through non-aromatic linkages such as alkylene or alkylidene groups; and a divalent aralkyl radical such as tolylene, xylylene, and the like, The copolyester-carbonate resins used in the method of the invention include some which are generally well known. In general, they are prepared as described above for the preparation of polycarbonate, but by the added presence of a difunctional carboxylic acid (ester precursor) in the water immiscible solvent; see for example U.S. Pat. No. 3,169,121 and 4,487,896 incorporated herein by reference thereto.

In general, any difunctional carboxylic acid (dicarboxylic acid) conventionally used in the preparation of linear polyesters may be utilized in the preparation of the linear copolyester-carbonate resins branched by the process of the instant invention. Generally, the difunctional carboxylic acids which may be utilized include the aliphatic carboxylic acids, the aromatic carboxylic acids, and the aliphatic-aromatic carboxylic acids. These acids are well known and are disclosed for example in U.S. Pat. No. 3,169,121, which is hereby incorporated herein by reference. Representative of such difunctional carboxylic acids are difunctional carboxylic acids of the formula:

$$HOOC-(R^3)-COOH \qquad (IV)$$

wherein $R^3$ has the meaning previously ascribed to it.

Preferred difunctional carboxylic acids employed are the aromatic dicarboxylic acids. Particularly useful aromatic dicarboxylic acids are those represented by the general formula:

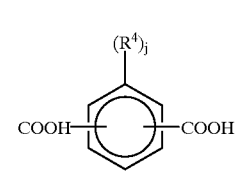

(V)

wherein j is a positive whole integer having a value of from 0 to 4 inclusive; and each $R^4$ is independently selected from the group consisting of alkyl radicals, preferably lower alkyl radicals (containing from 1 to about 5 carbon atoms).

Mixtures of these difunctional carboxylic acids may be employed as well as single acids. Therefore, where the term difunctional carboxylic acid is used herein it is to be understood that this term includes mixtures of two or more different difunctional carboxylic acids as well as individual carboxylic acids.

Most preferred as aromatic dicarboxylic acids are isophthalic acid, terephthalic acid, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the difunctional carboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example, instead of using isophthalic acid, terephthalic acid or mixtures thereof, it is possible to employ isophthaloyl dichloride, terephthaloyl dichloride, and mixtures thereof. It should be understood then that the term "difunctional carboxylic acid" as used herein, includes the reactive derivatives.

The proportions of reactants employed to prepare the linear copolyester-carbonate resins will vary in accordance with the proposed use of the product resin. Those skilled in the art are aware of useful proportions, as described in the U.S. patents referred to above. In general, the amount of the ester bonds may be from about 5 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester carbonate of 80 mole percent ester bonds.

In the conventional polymerization methods of preparing polycarbonates, a molecular weight regulator (a chain stopper) is generally added to the reaction mixture prior to or during the contacting with a carbonate precursor. Useful molecular weight regulators include, but are not limited to, monohydricphenols such as phenol, chroman-I, para-tertiary-butylphenol p-cumylphenol and the like. Techniques for the control of molecular weight are well known in the art and used for controlling the molecular weight of the polycarbonate branching agent resins used in the present invention.

In accordance with the process of the present invention, a branching resin as described above is homogeneously admixed with the linear polycarbonate resin to be branched. Admixture may be carried out with the aid of conventional resin mixing apparatus, including but not limited to conventional resin extruders equipped to mix two different resin materials, dry mixers and the like. The solid resins may be pre-mixed before introduction into the extruder. Conventional resin extruders are readily available and, accordingly, are preferred for homogeneously admixing the resin to be branched.

A branching proportion of the branching resin will depend upon the density of branches desired and the number of branch sites available. In general, from about 0.1 to 25 percent by weight of the linear polycarbonate, will comprise a branching proportion of branching agent resin.

The thermoplastic branching resins of formula (I) given above are well known as Novolak resins prepared by the polymerization of monomeric phenols with formaldehyde in a molar ratio of 1:1 and in the presence of an acid catalyst. Preferably the Novolak resin has 3 to 10 phenol moieties per molecule and an average degree of polymerization of 4 to 5.

The thermoplastic molding resin compositions of the instant invention containing branching resins having units of the formula (I) may also be admixed with various commonly known and used additives such as, for example, antioxidants; antistatic agents; inert filler such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; color stabilizers such as the organophosphites; thermal stabilizers such as phosphite; flame retardants; and mold release agents.

The actual branching of the linear polycarbonate resin is effected advantageously by a transesterification reaction. The transesterification reaction is promoted by heating the mixed reactant resins to a transesterification temperature (generally within the range of from about 100° to 300° C., preferably 200° to 250° C.). Transesterification catalysts for polycarbonates are well-known to the skilled artisan.

A catalytic proportion of a transesterification catalyst may be present to promote the exchange. A catalytic proportion is generally one within the range of from about 0.00001 to 0.01 parts by weight of the resin composition. Useful transesterfication catalysts are basic catalysts conventionally employed in transesterification reactions. Representative of such catalysts are oxides, hydrides, hydroxides or amides of alkali or alkaline earth metals such as, for example, lithium hydroxide and the like. Also, basic metal oxides such as zinc oxide, and the like. Also representative of transesterification catalysts are salts of weak acids such as lithium stearate; organotin catalysts such as dibutyltin oxide; aluminum or boron anion containing catalysts such as those described in U.S. Pat. Nos. 4,330,669 and 4,395,062 and the like. One or more catalysts may be used in combination.

The following examples and preparations describe the manner and process of making and using the invention and set forth the best mode contemplated by the inventor of carrying out the invention but are not to be construed as limiting the invention. Where reported, the following tests were carried out:

Intrinsic Viscosity (IV)

The intrinsic viscosity of polycarbonates was measured at a temperature of 25° C. in methylene chloride and is reported in deciliters/gram (dl/g).

R*:

R* may be calculated as follows:

STEP 1 Generate viscosity (h *) and elastic modulus (G') data on test compositions at three temperatures, with a rotational rheometer such as the RDS 7000, (Rheometrics Inc.).

STEP 2 Using the data from STEP 1 fitted to the Arrhenius type equations, calculate optimum melt temperature for parison extrusion (i.e., the temperature required to yield a melt viscosity of 20,000 poise at 100 $sec^{-1}$).

STEP 3 Calculate the ratio of viscosity at low shear rate (1 $sec^{-1}$ nominal) to viscosity at 100 $sec^{-1}$ (20,000 poise), R*, at temperature estimated in STEP 2. Elastic modulus values (@1 $sec^{-1}$) are also calculated at this temperature.

Branched polycarbonate resins useful for blow molding usually have an R* value of from about 2.2 to about 4.5. Thus, if resins made by the process of the present invention are to be used directly for blow molding, the level of branching agent is selected to provide a branched polycarbonate having an R* value in the range of from about 2.2 to about 4.5. If, however it is advantageous to use the branched polycarbonate resins for blending with linear polycarbonate resins, the preferred R* value is in the range of from about 4.5 to about 7.0. Thus, the branched polycarbonate resins made by the process of the present invention will generally have R* value from about 2.2 to about 7.0.

A linear polycarbonate usually has an R* value of about 1.45 and is typically used as the starting material in the process of the present invention. However, slightly branched polycarbonate resins may also be employed as raw materials and usually will have an R* value of less than 2.0 and more usually less than about 1.5.

Molecular Weight ($M_w$)

The weight average molecular weight ($M_w$) may be determined by gel permeation chromatography (GPC) in chloroform relative to polystyrene standards using a UV detector at 254 nm.

EXAMPLE 1

A quantity of a linear polycarbonate resin (PC-135, General Electric Company, Pittsfield, MA.) was compounded on a melt extruder (a co-rotating twin screw extruder with a barrel length of 950 mm, and a screw length of 951 mm) under a vacuum of 0.5 atmospheres at 300 RPM and at a temperature profile of 200–300° C. with 0.3 percent (w/w) of a phenolic resin (ALNOVOL PN 320, Vianova Co. (Hoechst) with a distribution of 3 to 10 phenol-moieties per molecule. Average degree of polymerization is 4–5.

Also added to the compounding was a catalyst tetrabutylphosphonium tetraphenylborate (catalyst A) or hexaethyl guanidinium bis-BPA (catalyst B), 300 ppm each.

Upon extrusion, the compounded resin was chopped and representative samples tested for physical properties. The properties are reported below in Table 1.

TABLE 1

| Formulation: | Branching level | T(R*) (° C.) | R* | MW (D) |
|---|---|---|---|---|
| PC135/Alnovol PN320[3] | 0.20 | 282 | 2.5 / 3.02 | 35200 |
| PC135/Alnovol PN320 catalyst A | 0.27 | 254 | 2.4 / 3.10 | 28000 |
| PC135/Alnovol PN320 catalyst B | 0.27 | 268 | 2.7 / 3.34 | 31700 |

What is claimed:

1. A process for branching a thermoplastic, linear, polycarbonate resin, which comprises;

providing a linear polycarbonate resin;
    homogeneously mixing with the linear polycarbonate resin, a branching proportion of a thermoplastic, polymeric, branching resin having formula:

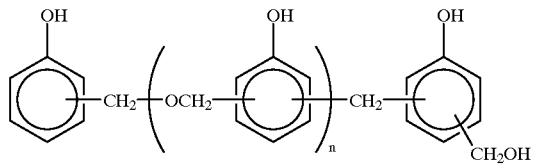

wherein n is an integer of from 1 to 10; and
    effecting a branching reaction between the linear polycarbonate resin and the branching resin.

2. The process of claim 1 wherein the linear polycarbonate resin has recurring chain units of the formula:

wherein D is a divalent aromatic radical of a dihydric phenol employed in the polymerization reaction, which comprises the reaction of the dihydric phenol with a carbonate precursor.

3. The process of claim 2 wherein the linear polycarbonate resin has an R* value of less than 2.0.

4. The process of claim 1 wherein the polymeric branching resin is a novolak phenolic resin.

5. The process of claim 1 wherein the reaction is at a temperature range of from 100° C. to 300° C.

6. The process of claim 1 wherein the reaction is carried out under melt extrusion conditions.

7. The process of claim 6 carried out in the presence of a transesterification catalyst.

8. The product of the process of claim 1.

9. The process of claim 4, wherein the novolak phenolic resin has a distribution of about 3 to about 10 phenol moieties per molecule and an average degree of polymerization of 4 to 5.

10. The process of claim 1, wherein n is an integer of from 1 to 8.

* * * * *